Figure 1:
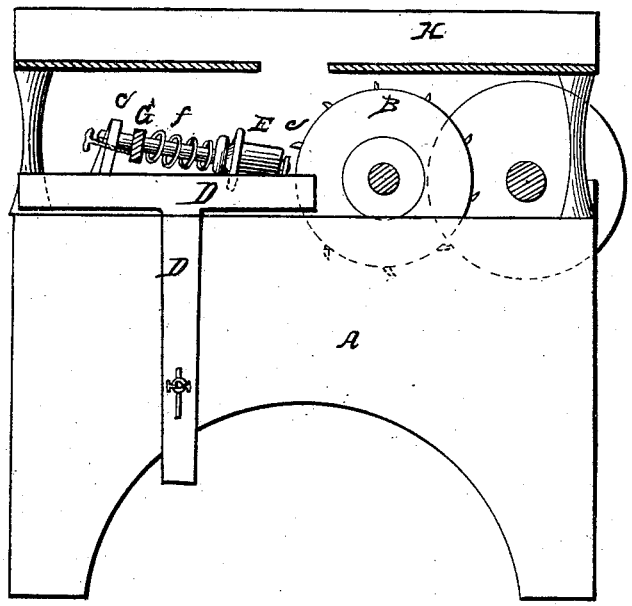
Figure 2:
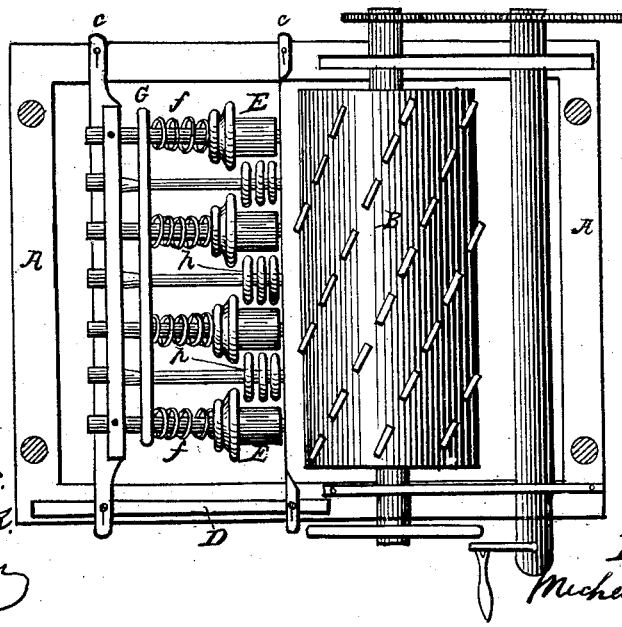

M. BOMBERGER.
Corn Sheller.

No. 22,481. Patented Jan'y 4, 1859.

Witnesses.
John F. Clark
Edw. F. Brown

Inventor.
Micheal Bomberger

UNITED STATES PATENT OFFICE.

M. BOMBERGER, OF HUMMELSTOWN, PENNSYLVANIA.

CORN-SHELLER.

Specification of Letters Patent No. 22,481, dated January 4, 1859.

*To all whom it may concern:*

Be it known that I, MICHEAL BOMBERGER, of Hummelstown, in the county of Dauphin and State of Pennsylvania, have invented certain new and useful Improvements in Corn-Shellers; and I do hereby declare that the following is a full, clear, and exact description thereof, reference being had to the accompanying drawings, making a part of this specification.

The nature of my improvement in corn shellers is in providing them with flanged rollers revolving on stationary shafts or axles placed at right angles to the shelling cylinder, which work in combination with loose rings also placed on other shafts at right angles to the shelling cylinder, (the aforesaid rollers being provided with helical springs,) all the parts of the machine so arranged that corn dropped from a hopper above the rollers, shall be held by the flanges of said rollers and by the loose rings until the cob is divested of the grain and at the same time allow the cob to be carried toward the delivery side of the machine, leaving the shelled grain to drop between the rollers and rings, free from the cobs.

It further consists in so arranging a loose bar against which the springs press, that the springs will mutually assist each other, thus allowing them to be made light and yet efficient.

To enable others to make and use my improved sheller it may be described as follows: A A' is a rectangular frame; B is the shelling cylinder, the teeth or spikes of which are placed spirally; by means of a pinion and cog wheel the cylinder is driven; $c, c$, are transverse bars placed parallel with the cylinder, having one of their ends pivoted on bolts secured in the side framing of A while the other ends are bolted loosely to a bar D; this bar has a stem descending from it, provided with a slot and thumb screw, so that the bar D may be raised or lowered as expedient in giving a greater or less inclination to the plane forward with the rollers E E these rollers are provided with high flanges and turn freely on shafts or axles extending from bars $c\ c$; $(f\ f)$ are helical springs also on the axles placed behind the rollers; G is a third and intermediate bar through which the axles of the rollers pass freely. The function of this bar is that of transferring the pressure of an ear of corn on the spring say of the right hand of the machine to those on the left, and vice versa; $(h, h,)$ are loose rings placed on shafts extending from bar $c$ to $c$; they are to retard partially the ear and by allowing the rows of corn (or grain) to drop between them give the ear a twisting movement resembling hand shelling; they are retained on their shaft, by the flanges on the rollers and the front bar $c$; H is a hopper placed above the machine having a suitable opening in its bottom for passing the corn.

The manner of operating upon the ears of corn is as follows: Upon the ear being dropped from the hopper, it falls upon the loose rings $h, h,$ and rollers E E and as it passes over the rings, the rows of grain while on the cob fall between the loose rings and separate them, so that the ear is slightly twisted, and in its movement from the right to the left these rings serve to hold back or retain the ear until the grain is completely divested from the cob, then the rollers pass it out of the machine. If it were not for these loose rings the rollers would have a tendency to pass the cob too rapidly from the machine and before it was completely cleared of the grain.

What I claim as my invention and desire to secure by Letters Patent, is—

1. So arranging the rollers E, E, (provided with helical springs as described) in combination with the loose rings $h, h,$ as to operate in the manner and for the purposes as set forth.

2. I also claim the employment of the loose bar G when arranged with rollers E E helical springs $f$, adjusting bars D, D, and shelling cylinder B, substantially as and for the purposes described.

In testimony whereof I have hereunto signed my name before two subscribing witnesses.

MICHEAL BOMBERGER.

Witnesses:
JOHN F. CLARK,
EDM. F. BROWN.